United States Patent [19]

Sakai et al.

[11] Patent Number: 5,367,568
[45] Date of Patent: Nov. 22, 1994

[54] SWITCHBOARD TERMINAL APPARATUS HAVING A PLURALITY OF LOOP CIRCUITS

[75] Inventors: Nobuyuki Sakai; Hiroaki Kikuchi, both of Tokyo, Japan

[73] Assignee: NEC Corporation, Tokyo, Japan

[21] Appl. No.: 883,374

[22] Filed: Aug. 15, 1992

[30] Foreign Application Priority Data

May 17, 1991 [JP] Japan .................................. 3-140675

[51] Int. Cl.$^5$ ............................................. H04M 3/42
[52] U.S. Cl. ..................................... 379/309; 379/94; 379/266
[58] Field of Search .................. 379/266, 309, 94, 308, 379/247, 122

[56] References Cited

U.S. PATENT DOCUMENTS

| | | | |
|---|---|---|---|
| 3,294,922 | 12/1966 | Schneider et al. | 179/27 |
| 3,297,828 | 1/1967 | Baumfalk et al. | 179/27 |
| 3,702,380 | 11/1972 | Gueldenpfenning | 379/266 |
| 4,599,493 | 7/1986 | Cave | 379/309 |
| 4,656,623 | 4/1987 | Dalby | 379/94 |
| 4,656,624 | 4/1987 | Collins | 379/94 |
| 4,951,310 | 8/1990 | Honda | 379/266 |
| 4,953,204 | 8/1990 | Cuschleg | 379/266 |

OTHER PUBLICATIONS

"KDX-O Service Position-Computer-Aided Telephone Operation System," Nakagome et al., IEEE 1972 International Switching Symposium, 6-9 Jun. 1972, pp. 104-112.

Primary Examiner—James L. Dwyer
Assistant Examiner—Michael N. Lau
Attorney, Agent, or Firm—Foley & Lardner

[57] ABSTRACT

In a switchboard terminal apparatus, a plurality of loop circuits are simultaneously handled by a switchboard operator. The number of loop circuits in the apparatus exceeds the capacities of screen displays and keys/lamps. A normal loop circuit controller controls loop circuits up to the capacities as normal loop circuits. A virtual loop circuit controller controls loop circuits exceeding the capacities as virtual loop circuits. A first switching circuit for switching control of the loop circuit, which processes a given call, from the normal loop circuit controller to the virtual loop circuit controller in accordance with a call release request operation of the given call by the switchboard operator. A second switching circuit switches a call being controlled by the virtual loop circuit controller to a call under the normal loop circuit controller when a reentering operation of the switchboard operator occurs by regarding the call as a virtual incoming call to the normal loop circuit. A virtual queue controller controls the call in a virtual incoming call queue state during switching by the second switching circuit.

7 Claims, 2 Drawing Sheets

SWITCHBOARD TERMINAL APPARATUS HAVING A PLURALITY OF LOOP CIRCUITS

BACKGROUND OF THE INVENTION

The present invention relates to loop circuits in a switchboard connected to an exchange and, more particularly, to a switchboard terminal apparatus in which a switchboard operator operates four to six or more loops.

In a conventional switchboard loop circuit system, a switchboard terminal, e.g., an attendant console in a small-scale system has displays and keys/lamps controllers respectively corresponding to loops arranged in the switchboard terminal. A switchboard operator performs multiloop operations by the number of loop circuits arranged in the switchboard. For example, if the switchboard terminal has six loop circuits, the switchboard operator can simultaneously handle a maximum of six calls, and the seventh or subsequent incoming calls to the switchboard are set in a queue to wait for idle loop circuits.

When the switchboard operator has finished an operation for a given call and performs its release operation, and if the given call is put in a calling state for the extension subscriber and no answer is made within a predetermined period of time, a reentering request of the switchboard operator is made. In this case, the given call is kept held while being kept connected to a loop circuit. However, when the given call does not request for a reentering of the switchboard operator, the given call is released from the loop circuit, and this loop circuit becomes idle. This circuit is then used for the next incoming call or an outgoing call from the switchboard operator.

In the above conventional switchboard loop circuit system, in order to increase the number of calls simultaneously handled by the switchboard operator, the number of loop circuits included in the switchboard terminal must be increased, and at the same time the capacities of terminal screen displays and keys/lamps must also be increased accordingly. It is difficult to arrange seven or more loop circuits in the conventional switchboard loop circuit system in practice.

In a call release request operation by the switchboard operator, when a reentering request of the switchboard operator is predicted, a call is kept held while being kept connected to a loop circuit regardless of actual generation/non-generation of a reentering request. As a result, the loop circuit is invalidly kept held.

SUMMARY OF THE INVENTION

It is an object of the present invention to provide a switchboard terminal apparatus capable of increasing the number of calls simultaneously handled by a switchboard operator regardless of the capacities of keys/lamps.

It is another object of the present invention to provide a switchboard terminal apparatus capable of preventing invalid holding of a loop circuit.

In order to achieve the above objects of the present invention, there is provided a switchboard terminal apparatus comprising a plurality of loop circuits which are simultaneously handled by a switchboard operator and the number of which exceeds capacities of screen displays and keys/lamps, normal (real) loop circuit control means for controlling loop circuits up to the capacities as normal loop circuits, virtual loop circuit control means for controlling loop circuits exceeding the capacities as virtual loop circuits, first switching means for switching control of the loop circuit, which processes a given call, from the normal loop circuit control means to the virtual loop circuit control means in accordance with a call release request operation of the given call by the switchboard operator, second switching means for switching a call being controlled by the virtual loop circuit control means to a call under the normal loop circuit control means when a reentering operation of the switchboard operator occurs by regarding the call as a virtual incoming call to the normal loop circuit, and a virtual queue control means for controlling the call in a virtual incoming call queue state during switching by the second switching means.

DESCRIPTION OF THE PREFERRED EMBODIMENT

Figure 1:
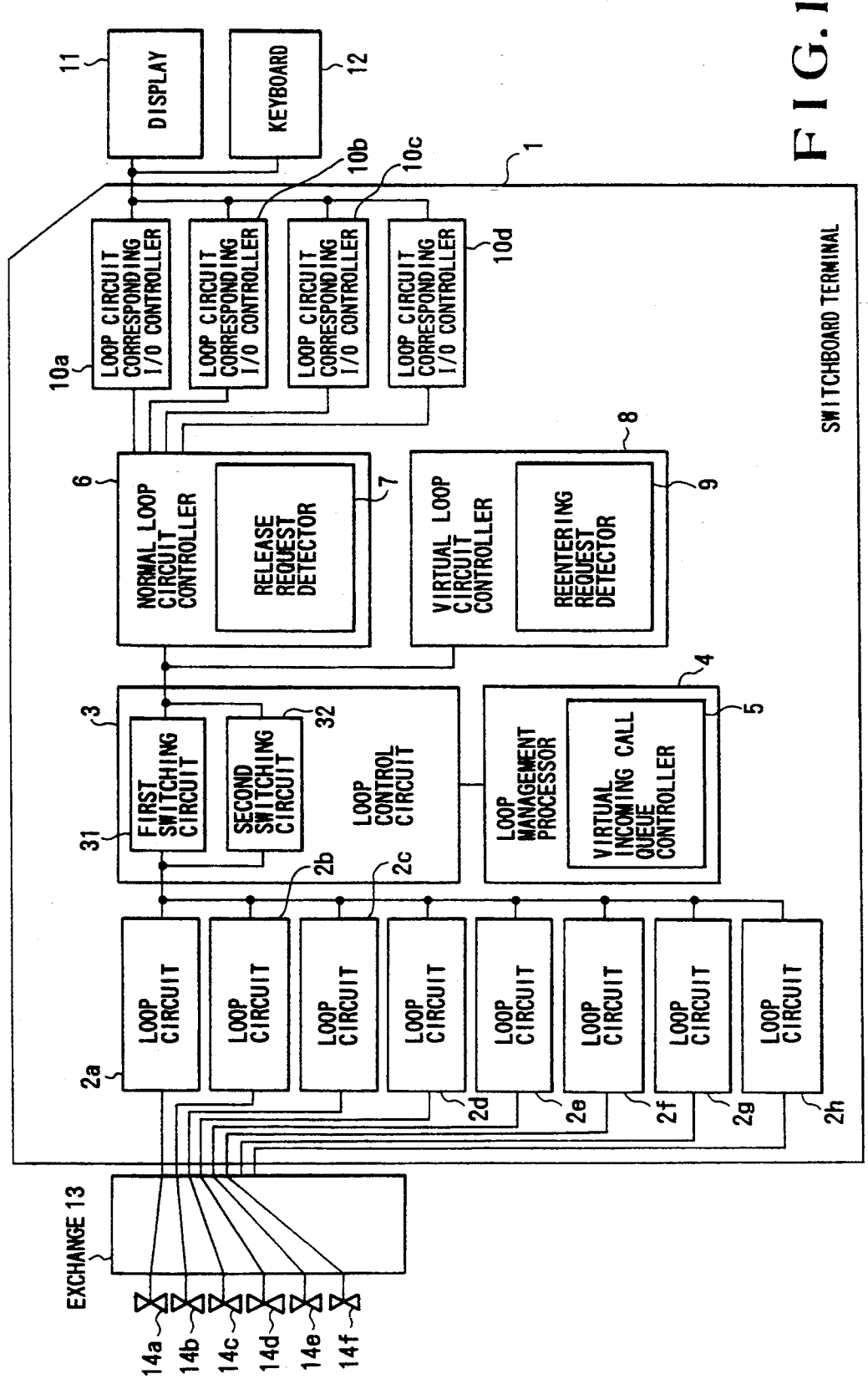
FIG. 1 is a block diagram showing a switchboard terminal apparatus according to an embodiment of the present invention.

FIG. 1 shows a switchboard terminal apparatus according to an embodiment of the present invention. More particularly, FIG. 1 shows switchboard loop circuits and their controllers.

Referring to FIG. 1, reference numeral 1 denotes a switchboard terminal; 2a, 2b, . . . , 2h, loop circuits, respectively; and 3, a loop control circuit. The loop control circuit 3 comprises a first switching circuit 31 for switching a loop circuit, which has handled a given call, to a virtual loop circuit when a switchboard operator performs a call release request operation of the given call, and a second switching circuit 32 for switching a call to a normal (i.e., real) loop circuit through a reentering operation of the switchboard operator by regarding this call as a virtual incoming call to the normal loop circuit when an event for requesting reentering of the switchboard operator has occurred. Reference numeral 4 denotes a loop management processor for managing loop states of the loop circuits 2a to 2h; 5, a virtual incoming call queue controller, arranged in the loop management processor 4, for switching a call to a normal loop circuit through a reentering operation of the switchboard operator; 6, a normal loop circuit controller; 7, a release request detector arranged in the normal loop circuit controller 6; 8, a virtual loop circuit controller for loop circuits, the number of which exceeds the capacities of terminal screen displays and keys/lamps of the switchboard terminal 1, as virtual loop circuits; 9, a reentering request detector arranged in the virtual loop circuit controller 8; 10a, 10b, . . . , 10d, loop circuit corresponding I/O controllers, respectively; 11, a display connected to the switchboard terminal 1; 12, a keyboard; 13, an exchange; and 14a, 14b, . . . , 14f, subscribers, respectively.

In this embodiment, the switchboard terminal 1 has a capacity for the terminal screen displays and keys/lamps so as to correspond to a maximum of four loop circuits respectively corresponding to the loop circuit corresponding I/O controllers 10a to 10d. In practice, the eight loop circuits 2a to 2h are connected between the switchboard terminal 1 and the exchange 13.

In order to handle incoming calls from the subscribers 14a to 14f connected to the exchange 13 to the switchboard terminal 1 or outgoing calls from the switchboard operator to the subscribers, the loop circuits 2a to 2h are arranged in the switchboard terminal 1. The loop circuits 2a to 2h are connected to the loop control circuit 3 to control a speech path and I/O operations of the display 11 and the keyboard 12 in accordance with the loop management processor 4 for controlling the loop states of the loop circuits 2a to 2h.

The switchboard shown in FIG. 1 includes the four loop circuit corresponding I/O controllers 10a to 10d and can simultaneously handle a maximum of four calls. In a normal operation, four loop circuits are controlled by the normal loop circuit controller 6, and the fifth to eighth loop circuits are controlled by the virtual loop circuit controller 8 without any interface with the switchboard operator.

Figure 2:
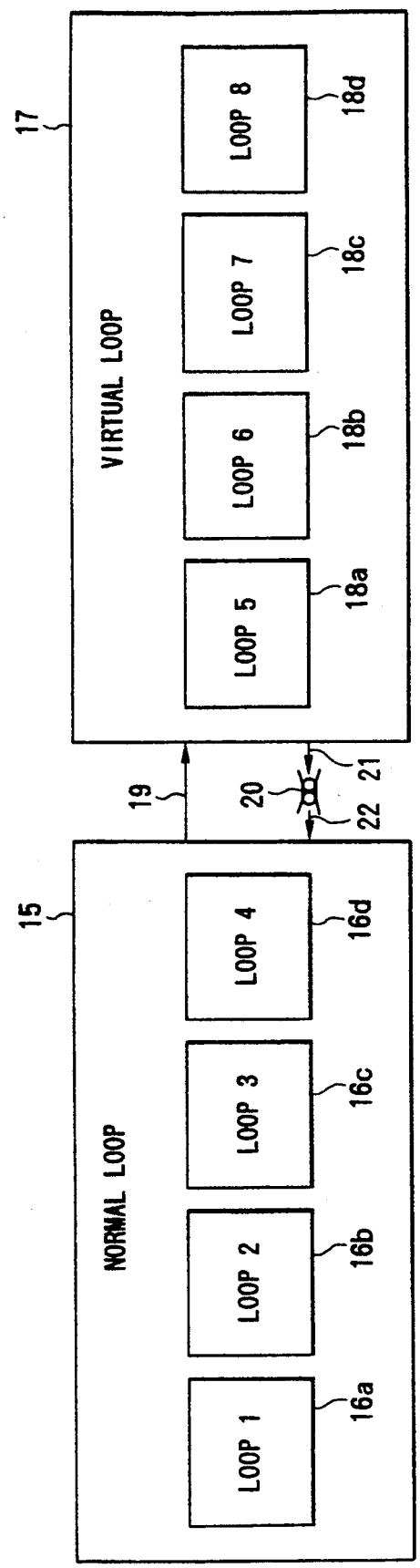
FIG. 2 is a view showing a state transition in loop circuits shown in FIG. 1.

FIG. 2 explains an operation of the system configuration in FIG. 1. More specifically, FIG. 2 explains a state transition of the loop circuits shown in FIG. 1.

Referring to FIG. 2, reference numeral 15 denotes a normal loop; 16a to 16d, loop 1 to loop 4, respectively; 17, a virtual loop; 18a to 18d, loop 5 to loop 8, respectively; 19, a loop release operation; 20, a virtual incoming call queue; 21, a reentering request; and 22, a answer.

The operation of the embodiment will be described with reference to FIG. 1.

A method using a virtual loop circuit will be described below.

Assume that a call between the switchboard operator and the subscriber 14a is connected by the loop circuit 2a, and that inputs/outputs of the keyboard 12 and the display 11 are controlled by the loop circuit corresponding I/O controller 10a.

When handling of this call is completed and the switchboard operator inputs a release request on the keyboard 12, the release request detector 7 in the normal loop circuit controller 6 detects this request. In answer to this request, the loop control circuit 3 and the loop management processor 4 determine whether this call requires reentering of the switchboard operator soon. If the loop control circuit 3 and the loop management processor 4 determine that reentering will be required soon, the loop circuit 2a is switched by the first switching circuit 31 and is put under the control of the virtual loop circuit controller 8. At the same time, an interface with the switchboard operator for the call is terminated. The loop circuit corresponding I/O controller 10a is set in an idle state and becomes ready to control other loop circuits 2b to 2h.

A call in the loop circuit 2a which is under the control of the virtual loop circuit controller 8 is set, upon occurrence of a reentering request event such as a nonanswer over a predetermined period of time, as described above, such that the reentering request detector 9 detects this event and in answer to this request, the loop management processor 4 instructs the virtual incoming call queue controller 5 to generate a virtual incoming call. The loop control circuit 3 selects one of the loop circuit corresponding I/O controllers 10a to 10d, and an incoming call is displayed on the display 11.

When the switchboard operator responds to this incoming call on the keyboard 12, the loop circuit 2a under the control of the virtual loop circuit controller 8 is switched to a state under the control of the normal loop circuit controller 6 by the second switching circuit 32.

A state transition of the loop circuits by use of virtual loops will be described with reference to FIG. 2.

The loops 16a to 16d set in a state of the normal loop 15 are switched to the state of the virtual loop 17, while the loops 18a to 18d set in a state of the virtual loop 17 are put into the virtual incoming call queue 20 upon occurrence of the reentering request 21. In accordance with the answer 22 by the switchboard operator, the loops 16a to 16d return to the state of the normal loop 15. In this case, the state of a call controlled by the loops 18a to 18d set in the virtual loop 15 is unknown to the switchboard operator.

As has been described above, according to the present invention, in a switchboard having a plurality of loop circuits operated by a switchboard operator who performs a multiloop operation, the number of loops exceeding the capacities of screen displays and the keys/lamps of the switchboard terminal can be operated, and the number of calls set in invalid holding states can be reduced, thereby improving efficiency of the switchboard.

What is claimed is:

1. A switchboard terminal apparatus connected to an exchange, comprising:

a plurality of loop circuits connecting said switchboard terminal to said exchange to handle incoming and outgoing calls, the number of said loop circuits exceeding a capacity of an interface of said switchboard terminal with a switchboard operator, said interface including means for information to said switchboard operator and for receiving operator inputs from said switchboard operator for a predetermined number of said incoming and outgoing calls, said predetermined number corresponding to said capacity of said interface;

real loop circuit control means for controlling one or more of said loop circuits each corresponding to one of said incoming and outgoing calls as real loop circuits, a number of calls being handled by said real loop circuits not exceeding said capacity of said interface;

virtual loop circuit control means for controlling loop circuits corresponding to calls which exceed said capacity of said interface as virtual loop circuits;

first switching means for switching control of one of said loop circuits handling a call from said real loop circuit control means to said virtual loop circuit control means in accordance with a call release request initiated by said switchboard operator;

second switching means for detecting an event requiring re-entry of a call being handled by one of said loop circuits controlled by said virtual loop circuit control means and displaying said call as a virtual incoming call and for switching control of said loop circuit handling said virtual incoming call from said virtual loop circuit control means to said real loop circuit control means by a reentering request operation of said switchboard operator; and virtual queue control means for controlling the call in a virtual incoming call queue state during switching by said second switching means.

2. An apparatus according to claim 1, further comprising a loop control means which controls said first and said second switching means, said loop control means being respectively connected between said real loop circuits and said real loop circuit control means and between said virtual loop circuits and said virtual loop circuit control means.

3. An apparatus according to claim 2, further comprising a loop management controller which includes said virtual queue control means, said loop management controller managing states of said loop circuits and controlling connections of inputs to said loop control means and outputs from said loop control means.

4. An apparatus according to claim 1, wherein said normal loop circuit control means comprises release request detecting means for detecting a call release request operation of the switchboard operator.

5. An apparatus according to claim 1, wherein said virtual loop circuit control means comprises a reentering request detector for detecting occurrence of the reentering request event of the switchboard operator.

6. An apparatus as recited in claim 1, wherein said reentering request operation of said switchboard operator is a response to said virtual incoming call.

7. A method of handling a plurality of calls on a switchboard, said switchboard having an interface with a switchboard operator for handling a predetermined number of calls and a plurality of loop circuits, a number of said loop circuits exceeding said predetermined number, each of said loop circuits being used to handle a call, said method comprising the steps of:

displaying information regarding a number of calls up to said predetermined number on a display, each of said displayed calls being handled by a corresponding one of said plurality of loop circuits, said corresponding loop circuits being controlled by a real loop circuit controller;

releasing a call being displayed on said display as a released call and terminating an interface with said switchboard operator for said released call;

determining whether said released call should be held for reentry;

transferring control of a loop circuit corresponding to said released call to a virtual loop circuit controller when said determining step indicates that said released call should be held for reentry;

detecting whether a reentry event has occurred for said released call;

generating a virtual incoming call from said released call when a reentry event is detected in said detecting step; and displaying information about said virtual incoming call on said display and retransferring control of said loop circuit corresponding to said released call from said virtual loop circuit controller to said real loop circuit controller for controlling said virtual incoming call.

* * * * *

UNITED STATES PATENT AND TRADEMARK OFFICE
CERTIFICATE OF CORRECTION

PATENT NO. : 5,367,568
DATED : November 22, 1994
INVENTOR(S) : SAKAI et al.

It is certified that error appears in the above-indentified patent and that said Letters Patent is hereby corrected as shown below:

On the cover page, item 22 contains a typographical error wherein "Aug. 15, 1992" should read --May 15, 1992--.

Signed and Sealed this

Twenty-third Day of May, 1995

Attest:

BRUCE LEHMAN

Attesting Officer     Commissioner of Patents and Trademarks